Figures 1, 2, 3:
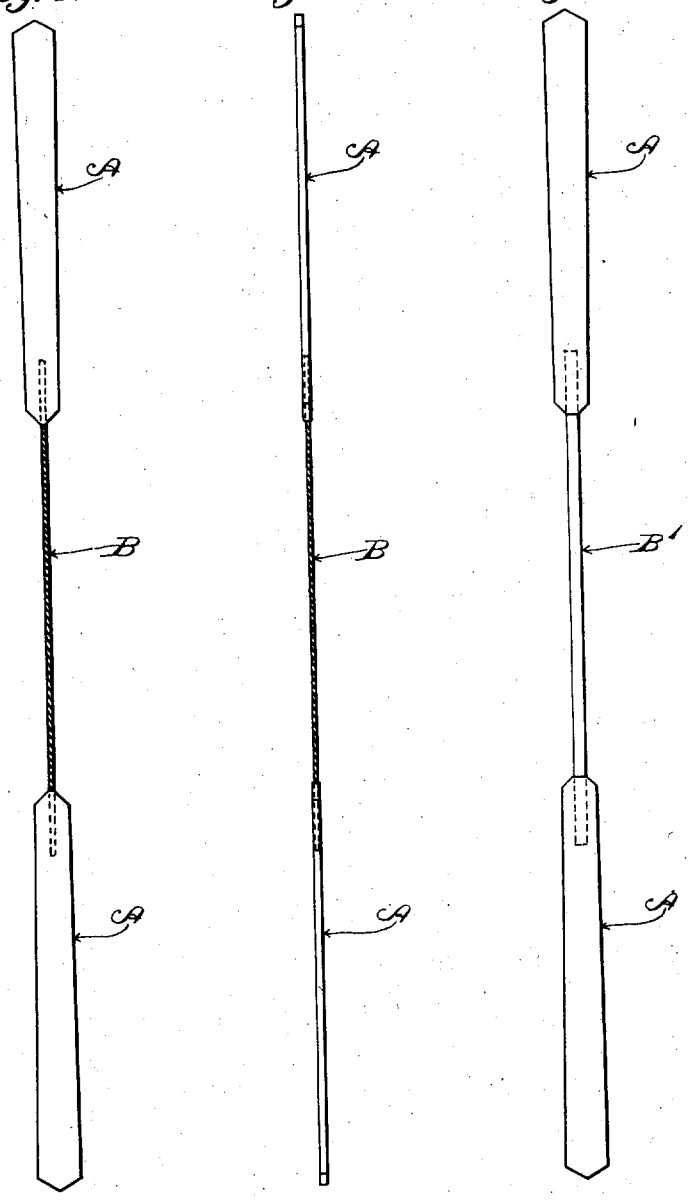

M. F. POWERS.

NECKTIE.

APPLICATION FILED JUNE 15, 1906.

12,873. Reissued Nov. 3, 1908.

Witnesses:
Oscar F. Hill
Edith J. Anderson

Inventor:
Milton F. Powers
by Chas. F. Randall
Attorney.

UNITED STATES PATENT OFFICE.

MILTON F. POWERS, OF WINCHESTER, MASSACHUSETTS.

NECKTIE

No. 12,873. Specification of Reissued Letters Patent. Reissued Nov. 3, 1908.

Original No. 768,299, dated August 23, 1904, Serial No. 184,275. Application for reissue filed June 15, 1906. Serial No. 321,945.

*To all whom it may concern:*

Be it known that I, MILTON F. POWERS, a citizen of the United States, residing at Winchester, in the county of Middlesex and State of Massachusetts, have invented certain new and useful Improvements in Neckties; and I do hereby declare the following to be a full, clear, and exact description of the invention, such as will enable others skilled in the art to which it appertains to make and use the same.

This invention relates to neckties; and more particularly to ties which are knotted or tied by the wearer, such for instance as so-called four-in-hands, Ascots, and string ties, as distinguished from made-up-scarfs and it consists in the novel construction and combination of the parts hereinafter fully described and claimed.

In the drawings, Figure 1 is a plan view of the necktie. Fig. 2 is a side view of the necktie. Fig. 3 is a plan view of the necktie, showing a modification.

The necktie is formed of two extended made-up end portions A A, of textile material, shaped so as to be fashioned into any of the forms of fancy knots or bows which are popular. The middle part B of the necktie, which extends around the back of the collar and is of a length to extend substantially around the neck of the wearer, is preferably formed of a cord the end portions of which are secured between the plies of the end portions A A in any approved manner. This form of necktie is very convenient for use in connection with certain forms and shapes of collars, and when the middle part B is formed of a round cord either end portion can be reversed without reversing the other end portion.

In the modification shown in Fig. 3 a narrow flat tape B′ is substituted for the round cord.

The essential characteristic of my invention is the fact that the middle or neck-band portion of the necktie is inelastic and is of solid, or substantially solid texture, as contradistinguished from the like portion composed of a plurality of plies loose and movable with relation to each other. The necktie is rendered much better adapted to be inserted between the two portions of a folded or turned-down collar, and to be shifted or adjusted after the collar has been fitted around the wearer's neck and buttoned. The necktie may be shifted lengthwise in either direction without straining or injuring the same, and will take up less space between the two portions of the collar than if composed of several loose plies, especially if it be less in thickness than the end-portions, as represented in the drawings.

What I claim is:—

1. In a necktie the combination, with two end portions formed of textile material, of a middle portion formed of a round cord the end portions of which are secured between the plies of the aforesaid end portions of the necktie.

2. In a necktie, the combination with the two extended made-up end portions adapted to be formed into a bow or knot, of an inserted middle or neck-band portion of inelastic and substantially solid texture connecting the said end-portions joined by its ends with ends of such end-portions and adapted to extend in a continuous piece substantially around the neck of the wearer.

In witness whereof I hereto affix my signature in the presence of two witnesses.

MILTON F. POWERS.

Witnesses:
CHAS. F. RANDALL,
EDITH J. ANDERSON.